United States Patent [19]

Clendinning et al.

[11] Patent Number: 4,774,296

[45] Date of Patent: Sep. 27, 1988

[54] BLOCK POLYMERS CONTAINING A POLY(ARYL ETHER KETONE) AND METHODS FOR THEIR PRODUCTION

[75] Inventors: Robert A. Clendinning, New Providence; James E. Harris, Piscataway; Donald R. Kelsey, Somerville; Markus Matzner, Edison; Lloyd M. Robeson, Whitehouse Station; Paul A. Winslow, Warren; Louis M. Maresca, Belle Mead, all of N.J.

[73] Assignee: Amoco Corporation, Chicago, Ill.

[21] Appl. No.: 729,580

[22] Filed: May 2, 1985

[51] Int. Cl.$^4$ ................. C08L 61/00; C08G 16/06
[52] U.S. Cl. ......................... 525/471; 528/125; 528/128; 528/220
[58] Field of Search ............... 525/471; 528/220, 372, 528/125, 128

[56] References Cited

U.S. PATENT DOCUMENTS 4,052,365  10/1977  Jones .......................... 528/206 X
4,609,714   9/1986  Harris et al. ..................... 525/471

*Primary Examiner*—Theodore E. Pertilla
*Attorney, Agent, or Firm*—Donald M. Papuga; William H. Magidson; Ralph C. Medhurst

[57] ABSTRACT

Described herein are crystalline block polymers and chain extended polymers containing blocks of crystalline poly(aryl ether ketones). Also, described herein are monomers and oligomers suitable for preparing the crystalline block polymers and chain-extended polymers. Further, described herein are methods for producing the crystalline block and chain-extended polymers, as well as the monomers and oligomers.

22 Claims, No Drawings

BLOCK POLYMERS CONTAINING A POLY(ARYL ETHER KETONE) AND METHODS FOR THEIR PRODUCTION

FIELD OF THE INVENTION

This invention is directed to novel solution polymerized crystalline block polymers containing blocks of crystalline poly(aryl ether ketones). This invention is also directed to novel monomers and oligomers. Also described herein are methods for producing the solution-polymerized crystalline block polymers, the monomers and the oligomers.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhaldies with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et a., U.S. Pat. Nos. 4,108,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol 22, August, pp. 1096-1103; Blundell et al., Polymer, 1983 vol. 24, August, pp. 953-958, Atwood et al., Polymer Preprints, 20, no. 1, April 1979, pp. 191-194; and Rueda et al., Polymer Communications, 1983, vol. 24, September, pp. 258-260. In early to mid-1970, Raychem Corp. Commercially introduced a PAEK called STILAN TM, a polymer whose acronym is PEK, each ether and keto group being separated by 1,4-phenylene units. In 1978, Imperical Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lbs/in$^2$) in the tensile impact test (ASTM D-1822). They have potential for a wide variety of uses, but because of the significant cost to manufacture them, they are expensive polymers. Their favorable properties classes them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers and thus would be classed as expensive polymers.

In all of the above described U.S. Patents, the copolymers that are described are random or ordered copolymers characterized in that all of the repeat units of the polymer are derived from monomers and are typically distributed randomly along the polymeric chains.

European Patent Application 125,816, filed Apr. 19, 1984, based for priority upon British Patent Application 8,313,110, filed May 12, 1983, is directed to a method for increasing the molecular weight by melt polymerization of a poly(aryl ether) such as PEEK.

The process of European Patent Application 125,816, provides a basis by melt polymerization above the crystalline melting point of the poly(aryl ether) to increase the molecular weight by chain extension of polymer blocks. The application theorizes that the procedure can be used for making the block copolymers described in U.S. Pat. Nos. 4,052,365 and 4,268,635. Implicit problems associated in the process of this application are the difficulty in controlling the molecular weight of the resulting polymer and/or limiting isomerization and the problems associated with branching. The process of this European application would appear to be advantageous in making composites where the linearity and solution properties of the final polymer are not so critical.

PAEK block copolymers have been described in U.S. Pat. Nos. 4,052,365 and 4,268,635. U.S. Pat. No. 4,052,365 describes random or block copolymers having repeating units of the structure $\{$-Ar—O—Ar—CO-$\}$ and $\{$-Ar—O—Ar—SO$_2$-$\}$. The patent states that these block copolymers are crystalline. U.S. Pat. No. 4,268,635 describes a process for preparing polymers containing $\{$-Ar—O—Ar—SO$_2$-$\}$ and $\{$-Ar—O—Ar—CO-$\}$ units which the patentee believes to contain block structures. The patent states that the polymers are crystalline and exhibit improved high temperature properties compared with totally random copolymers of similar composition. However, the block copolymers in said patents require units with —SO$_2$— linkages. The —SO$_2$— linkage tends to break up the crystallinity of the polymer which results in inferior properties as compared to polymers which do not contain the —SO$_2$— linkage but have ether and/or keto groups instead. Due to the amorphous nature of the sulfonyl containing component used in making these prior art block copolymers, lower rates of crystallization are induced and hence, their commercial utility is less than desirable. The —SO$_2$— component so adversely affects the crystallinity properties that there is a maximum limit in the T$_m$, far below that for the block polymers of this invention. A further deficiency of these prior art block copolymers is that they cannot be used to form compatible blends with other PAEKs.

THE INVENTION

This invention comprises solution-polymerized block polymers wherein the components of the block structure are tough crystalline poly(aryl ether ketone)s (PA- EK's). The block contains essentially ether groups (—O—) joined to keto groups (—CO—) through 1,4-phenylene groups. This invention is also directed to monomers and oligomers which are suitable for making the block copolymers. Also, this invention is directed to methods for making the monomers, the oligomers and the block copolymers.

The block polymers of this invention are tough, crystalline and have a good combination of physical and mechanical properties.

The block is bonded to another block of the same or different composition through one or more of an ether group, a keto group, or a divalent copolymeric chain extending unit. In the case where the blocks are the same, bonding is effected through a divalent monomer, dimer unit, or oligomeric unit connecting the blocks through ether groups to produce a copolymeric structure. In the preferred embodiment, with the possible exception of when the blocks are connected through a divalent chain extending single unit, the poly(aryl ether ketone) comprises essentially ether and keto groups joined through 1,4-phenylene groups. The block polymers of this invention preferably have a reduced viscosity of at least 0.9 dl/g as measured in sulfuric acid at 25° C. (concentration of 1 gm/100 ml).

The solution-polymerized polymers of this invention contain oligomeric blocks that are interconnected. The oligomeric blocks are homopolymers and copolymers having a chain length such that the number of mers therein is at least two. If two or more different oligomeric blocks are directly interconnected the polymers of this invention fall into the category of block polymers as defined in polymer chemistry. The polymers as defined herein can also contain two or more similar or identical blocks connected by a monomeric or oligomeric coupling unit, with the proviso that when the blocks are identical the coupling unit must be copolymeric. As a result, by reason of the coupling unit, the final material is a copolymer even though identical blocks are being joined.

In more specific terms, this invention comprises two classes of solution-polymerized block polymers, to wit, block copolymers and chain extended copolymers. In the case of the block copolymers, they are of the classical A—B, A—B—A, (AB)$_n$, A—B—C, etc., types. The chain extended copolymers are typically characterized by the structure X—x—A—x— wherein A is a block unit, all the A's can be the same or different and x is the chain extending monomer or dimer. When x is a large unit, for example, an oligomer, then for the purposes of this invention, the polymer would be classed a block copolymer. Further, x and A must be different structural units.

Block units, according to this invention, comprise oligomeric size structures, i.e., structures which contain at least two monomer units in sequence. Chain extending units comprise structures which are smaller than oligomeric, i.e., they are preferably monomer and dimer structures.

The PAEKs of this invention are characterized by a toughness measured as a tensile impact strength of greater than 50 ft-lbs/in$^2$ and crystallinity characterized by a distinct crystalline melting temperature ($T_m$) which is at least 100° C. greater than its second order glass transition temperature ($T_g$).

It should be understood that the crystalline block copolymers of this invention may involve randomization due to transetherification during the solution polymerization reaction. Ether links formed during polymerization are sufficiently reactive due to activation by adjacent ketone links to react with phenolic reactants and this leads to random chain scission at the ether links adjacent to the ketone links, and re-assembling. Ether links sandwiched between two ketone links are particularly susceptible to this scission reaction. This is well known in the art. See Atwood et al, British Polymer Journal, 1972, 4, 391–399; Atwood et al, Polymer, 1981, 22 August, 1096–1103. The rate of transetherification, however, is low in comparison to that of a typical nucleophilic polycondensation reaction, hence, the use of appropriate starting materials leads to the solution-polymerized block polymers of this invention. On the other hand, when two precursor blocks are reacted via solution-polymerized transetherification to yield the block copolymer, the reaction can easily be stopped at the block copolymer stage prior to total randomization.

The solution-polymerized block polymers of this invention are distinctive from those in the prior art by virtue of their enhanced linearity. This results in polymers which possess maximum crystallinity, crystallization rates and low viscosity to high performance characteristics. The solution-polymerized block polymers of this invention are made at relatively low temperatures, typically not in excess of 300° C. even under the most aggressive polymerization conditions, and this is contrasted with temperatures of 400° C. which are utilized in melt-polymerization procedures for chain extension of polyaryletherketones into polymer blocks (see European Patent Application 125,816, supra). Consequently, solution polymerization proceeds with minimal branching and isomerization, resulting in a polymer which provides the most favorable property characteristics.

DETAILED DESCRIPTION OF THE INVENTION

There are many varieties of PAEKs and they are made by one of two processes, viz. electrophilic and nucleophilic aromatic substitution reactions. The former is mainly achieved through Friedel-Crafts catalysis and has the advantage of allowing the use of relatively low cost starting materials such as terephthaloyl chloride, diphenyl ether and phosgene, but suffers in the past from the necessity to employ corrosive solvents such as HF and the existence of too much branching in the polymer structure. Nucleophilic aromatic substitution, unfortunately, requires the use of expensive fluorine substituted monomers such as difluorobenzophenone to achieve PAEKs with desirable properties. Alternative routes or alternative structures which can lower the cost of manufacture and/or improve the polymer properties would provide great advantages.

A facet of PAEK technology is that the crystalline melting point can be fairly accurately determined from the ether to keto (or ketone) ratio in the polymer. As the ratio goes up, the Tm goes down. There is a practical limit to a suitable Tm; that is the temperature at which the polymer must be molded and the degradation temperature of the polymer. If the molding temperature is at the degradation temperature, and sufficient polymer flow is not obtainable below that temperature, then the PAEK's Tm is too high. This means that the ether to keto ratio is too low and must be raised. Such can be achieved by increasing the ether containing and/or forming component in the polymer manufacture at the expense of the keto containing component. Increasing the ether content tends to increase the toughness of PAEKs and a dramatic alteration in the ether to keto ratio will provide noticeable changes in toughness. The tools for doing this are well within the capabilities of the skilled chemist knowledgeable of the techniques of electrophilic and nucleophilic aromatic substitution reactions. The displacement of these groups along the linear chain of the polymer is not believed to be narrowly critical to achieving the Tm and Tg properties.

THE FORMING REACTIONS

One of the attributes of this invention is that the ultimate block polymer will be made from a PAEK starter molecule (block precursor) which is oligomeric to significantly polymeric. As a rule, the PAEK starter molecule has a low enough molecular weight that is has a reduced viscosity below about 0.9 dl/g, as measured in concentrated sulfuric acid at 1 g/100 ml at 25° C. It is thus reacted with reactants which can form the other block or the chain extension between blocks by solution polymerization; indeed it is possible to combine the steps of block polymer or of chain extension in the same solution polymerization reaction. In this way a block polymer or a chain extended polymer having a reduced viscosity greater than 0.9 dl/gm. (as measured in concentrated sulfuric acid at 1 g/100 ml at 25° C.) is obtainable.

An important step in the block polymer synthesis is the preparation of the precursor blocks. This can be done by any of the known solution-polymerization procedures for making PAEK, except that the stoichiometry is selected such that the precursor's molecular weight is controlled and the precursor is end-capped with functional groups available for block copolymerization/chain extension reactions. However, if transetherification is the preferred route to block polymer formation, then the precursor need not require the presence of functional capping groups as such. Thus, the precursor can be formed from conventional reactants and by using conventional methods.

For example, by the electrophilic aromatic substitution reaction, an acid halide can be reacted with a wholly functionally aromatic organic compound to produce a host of PAEK precursor molecules. With just two monomers and a capping agent, and using such a technique, a host of halide terminated or oligomer precursors are possible. To illustrate this point, one may combine phosgene, diphenyl ether and terephthaloyl halide, with the capping agent p-fluorobenzoyl chloride, into many unique combinations. For example*:

*(In the following equations Ph is a phenyl or a 1,4 phenylene unit with the provision that where there are two carbonyl groups attached to the same phenyl ring up to 50% of these groups may be in the 1,3 position to each other. Of course, some 1,2- and 1,3-phenylene units can also be formed in the electrophilic substitution process.)

Reaction A:

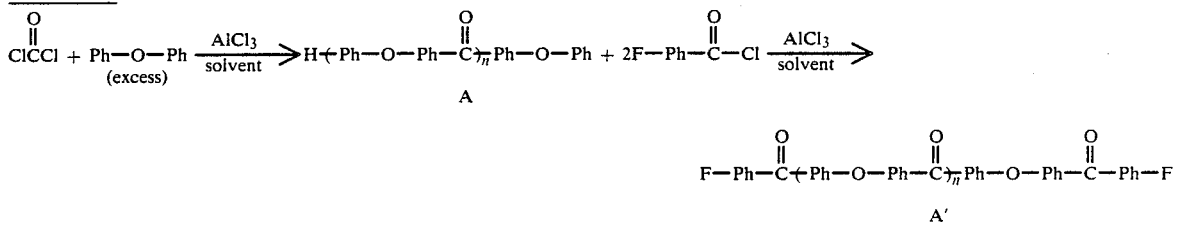

Reaction B:

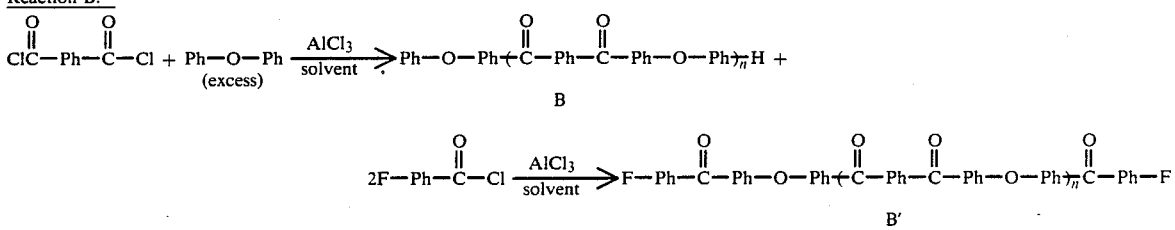

Reaction C:

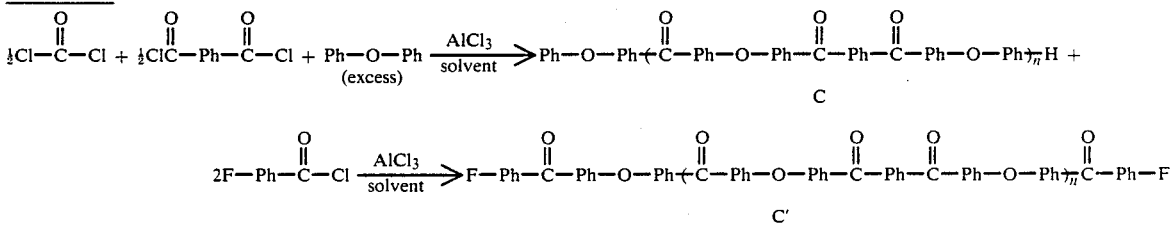

The above variety can be extended significantly by substituting a host of other aromatic compounds, thus described by Dahl and Dahl et al., supra, such as diphenoxybenzene, diphenoxybenzophenone, 4,4'-diphenoxy biphenyl, and the like, for part or all of the diphenyl ether. Obviously n need not be a very large number to provide a weight average molecular weight which achieves a reduced viscosity of at least 0.9 dl/g.

The fact that very useful block polymers made by this invention can utilize lower molecular weight block precursors is most desirable especially when the precursor is made by the electrophilic aromatic substitution reaction as above described. Such lower molecular weight precursors are more readily washed of the catalyst such that the resulting block polymer is cleaner and less prone to unwanted branching reactions during the final polymerization to the block polymer. It is thus an important feature of this invention that one is able to utilize precursors made by the electrophilic process (e.g. Friedel-Crafts reaction). Polymers with unique structures, displaying excellent toughness and thermal stability can be prepared in this manner.

Moreover, since the precursor is not a very high molecular weight species, less stringent temperature conditions and thus even volatile solvents may be used to prepare such precursor. This in turn can result in such benefits as better color and less branching. Of course, crystallization will be an ever present problem, and temperature and solvent selection will be dictated by this factor if the molecular weight chosen for the precursor creates such a problem. Needless to say, the options available to achieve successful polymer formation are numerous and in no way confining to only the procedures of the prior art for making the polymers of the prior art.

However, what is most desirable from the standpoint of PAEK manufacture, is that much of the block polymer can be derived from low cost starting materials such as phosgene, diphenyl ether and terephthaloyl chloride.

On the other hand, the block precursor may be made according, e.g., to Reactions A-C above without the fluorinated capping agent. In such a case, alteration in the stoichiometry will provide acyl halide end groups useful for further reactions. In summary, therefore, the precursors can be tailored such that the desirable block polymers can be formed by both electrophilic and nucleophilic aromatic substitution reactions. Thus the variety of procedures for making the block polymers of this invention are many, and unconventional techniques may be avoided.

For example, the precursors A', B', and C' prepared as shown above can be converted into block polymers using one or more of, for example, 4,4'-difluorobenzophenone, bis-p-(p-fluorobenzoyl)benzene, hydroquinone and/or biphenol; viz:

Reaction D:

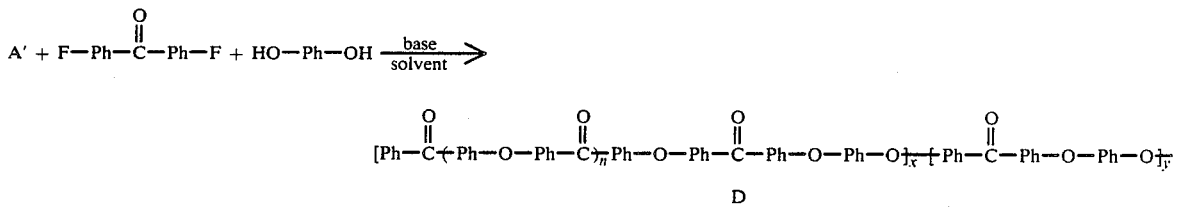

Reaction E:

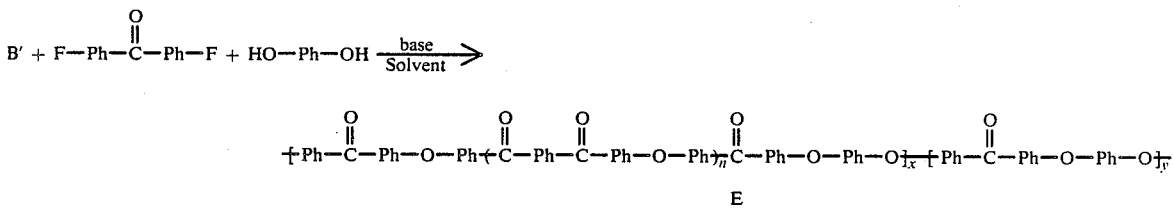

Reaction F:

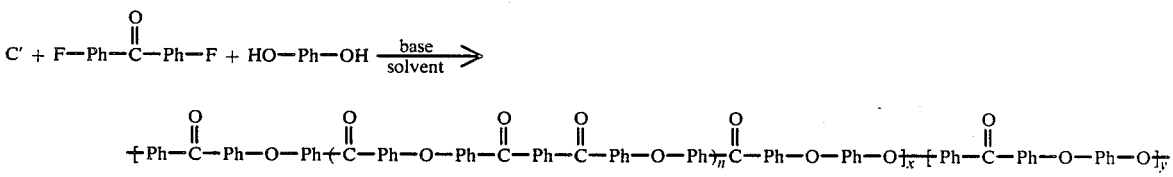

Reaction G:

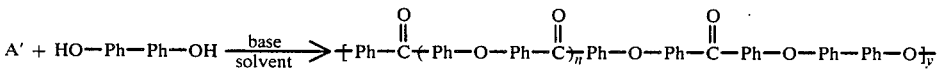

Reaction H:

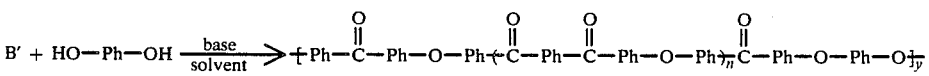

It should be appreciated that transetherification as discussed above will make the simplistic characterization of the block polymers much more complex, but the overall block structure should prevail imposing a significant structural difference from the PAEKs of the prior art.

The block precursors A-C and A'-C' above can be reacted by a further electrophilic aromatic substitution reaction to produce block polymers of this invention. In the preferred practice of this invention, the block precursors are made by either electrophilic or nucleophilic aromatic substitution reactions and the final polymerization to the block polymer is accomplished by the nucleophilic route. But it is of course also possible to employ electrophilic aromatic substitution reactions for both the precursor and final block polymerizations. This may be illustrated as follows:

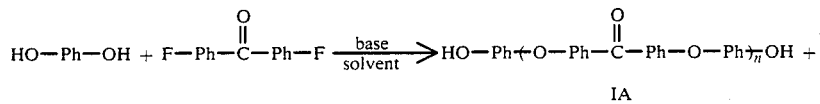

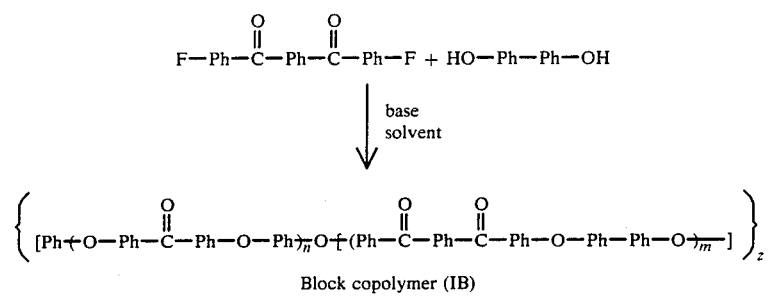

The PAEK block precursors

The crystalline PAEK block precursors which are suitable for forming the block copolymer with the exception of the end blocking portion can be generically characterized as containing repeating units, exclusive of the terminating groups, of one or more of the following formulae:

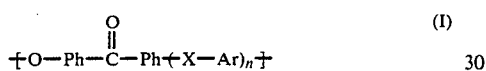 (I)

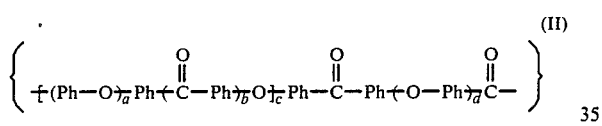 (II)

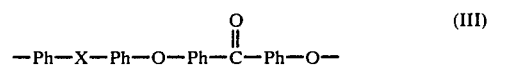 (III)

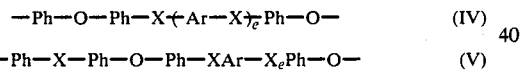 (IV)

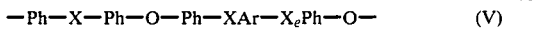 (V)

wherein Ar is independently a divalent aromatic radical such as phenylene or biphenylene, X is independently O,

or a direct bond and n is an integer of from 0 to 3, b, c, d and e are 0 to 1 and a is an integer of 1 to 4 and preferably d is 0 when b is 1.

Preferred block precursors include those having repeating units of the formula:

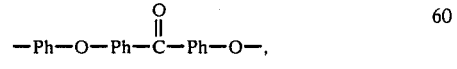

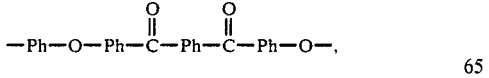

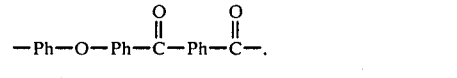

-continued

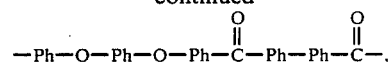

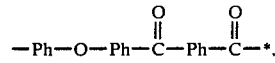

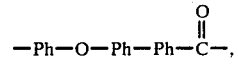

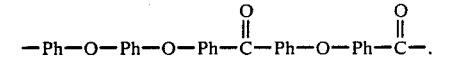

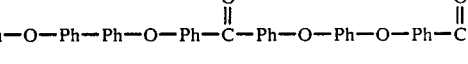

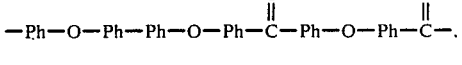

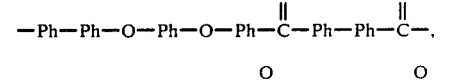

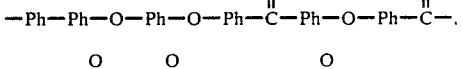

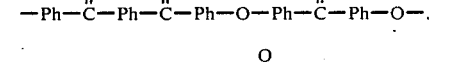

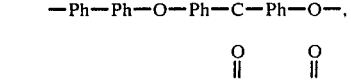

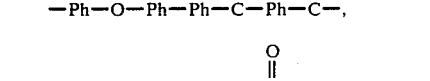

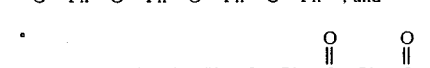

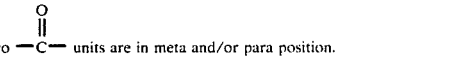

*The two —C— units are in meta and/or para position.

The nucleophilic method comprises heating a solvent solution of a mixture of at least one bisphenol and at least one dihalobenzenoid compound and/or at least one halophenol compound in which the halogen atoms are activated by CO groups ortho or para thereto in the presence of a base such as an alkali carbonate as described in, for example, Canadian Pat. No. 847,963 and U.S. Pat. No. 4,176,222. In making the precursor, one of the reactants is used in excess to provide a functional terminal group. The amount of such excess is used to control the molecular weight of the precursor. Alternatively, equimolar amounts of reactants can be used; in such case molecular weight (or extent of reaction) is controlled by stopping the reaction after a well-defined period of time.

Preferred bisphenols in such a process include:
4,4'-dihydroxybenzophenone,
4,4'-dihydroxybiphenyl, and
4,4'-dihydroxydiphenyl ether.

Phenols such as hydroquinone may also be used.

Preferred dihalobenzenoid and halophenol compounds include:
4-(4-chlorobenzoyl)phenol,
4-(4-fluorobenzoyl)phenol,
4,4'-difluorobenzophenone,
4,4'-dichlorobenzophenone,
4-chloro-4'-fluorobenzophenone,
1,4-bis(4-fluorobenzoyl)benzene,
1,3-bis(4-fluorobenzoyl)benzene,
4,4'-bis(4-fluorobenzoyl)diphenylether, and
4,4'-bis(4-fluorobenzoyl)diphenyl.

Also, PEAK block precursors such as those containing repeating units of the formula:

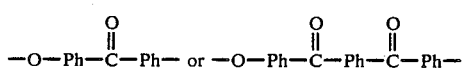

may be produced as described above by Friedel-Craft reactions utilizing hydrogen fluoride-boron trifluoride catalysts as described, for example, in U.S. Pat. Nos. 3,953,400, 3,441,538; 3,442,857 and 3,516,966.

Additionally, the precursors may be prepared by Friedel-Crafts processes as described in, for example, U.S. Pat. Nos. 3,065,205; 3,419,462; 3,441,538; 3,442,857; 3,516,966; and 3,666,612. In these patents a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The precursor may also be prepared according to the processes as described in, for example, U.S. Defensive Publication T 103,703 and U.S. Pat. No. 4,396,755. In such processes, reactants such as (a) an aromatic monocarboxylic acid, (b) a mixture of at least one aromatic dicarboxylic acid, and an aromatic compound, and (c) combinations of (a) and (b) are reacted in the presence of a fluoroalkane sulphonic acid, particularly trifluoromethane sulphonic acid.

Additionally, PAEK block precursors of the following formulas:

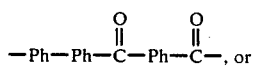

may also be prepared according to the process as described in U.S. Pat. No. 4,398,020. In such a process,
(a) a mixture of substantially equimolar amounts of
(i) at least one aromatic diacyl halide of formula YOC—Ar—COY where —Ar— is a divalent aromatic radical, such as 1,4-phenylene, Y is halogen, preferably chlorine, and COY is an aromatically bound acyl halide group, which diacyl halide is polymerizable with at least one aromatic compound of (a)(ii), and (ii) at least one aromatic compound of the formula H—Ar'—H wherein —Ar'— is a divalent aromatic radical such as diphenyl ether, and H is an aromatically bound hydrogen atom, which compound is polymerizable with at least one diacyl halide of (a)(i), or (b) at least one aromatic monoacyl halide of the formula H—Ar"—COY where —Ar"— is a divalent aromatic radical such as diphenoxybenzene, and H is an aromatically bound hydrogen atom, Y is halogen, preferably chlorine, and COY is an aromatically bound acyl halide group, which monoacyl halide is self-polymerizable, and (c) a combination of (a) and (b) is reacted in the presence of a fluoroalkane sulphonic acid.

In all of the electrophilic routes described above, the precursor molecular weight is controlled using known techniques. The preparation may, for example, be conducted in a solvent where precipitation takes place after a given molecular weight is reached. Control of the reaction time is another method to control precursor size. Many other methods exist and are well known to those skilled in the art.

The term PAEK as used herein is meant to include homopolymers, copolymers, terpolymers, graft copolymers, and the like, provided crystallinity of the PAEK is maintained. For example, any one or more of the units (I) to (V) may be combined to form copolymers, etc.

The Block Copolymers

The block copolymers may be depicted ideally as having the formula:

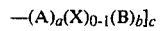

wherein the units A and B are a crystalline poly(aryl ether ketone), a and b are integers of at least 1, preferably at least 2 and most preferably at least 4, and c is an integer of 1 or greater, preferably from greater than 1 up to 100, and most preferably from 3 to 90, X is a monomeric —Ar'''—O— unit where Ar''' is a divalent arylene radical such as p-phenylene or an oligomeric radical such as Ar''''—O$_n$ where n is at least two and can be up to about 50 and Ar'''' is a divalent arylene group optionally containing carbonyl functions in its structure, i.e., Ar'''' can be, for example, p-phenylene or

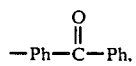

and the like. Where the blocks are identical X must be an oligomeric group.

The preferred block copolymers ideally are of the following formulae:

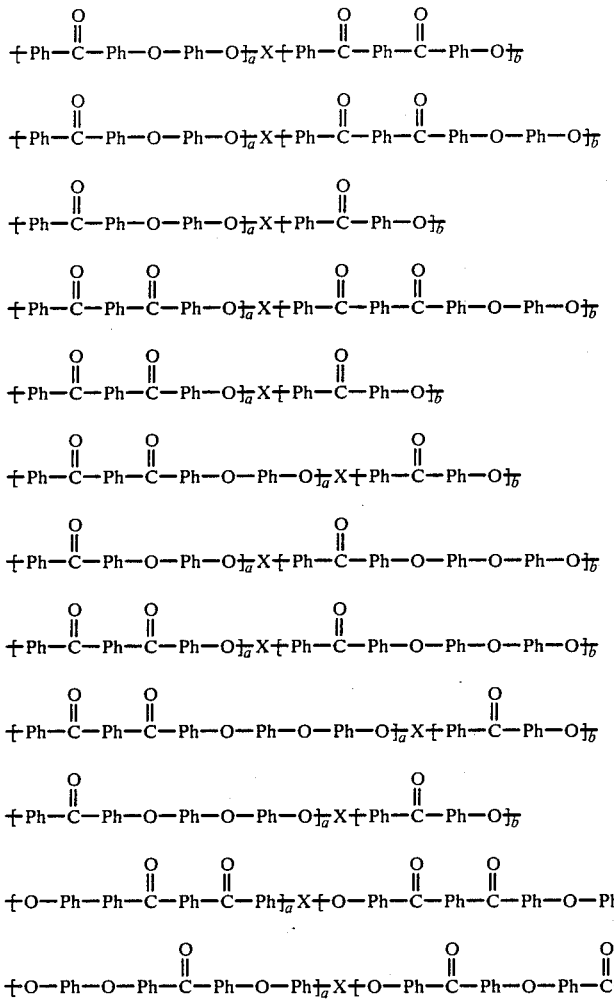

THE MOST PREFERRED EMBODIMENTS OF THE INVENTION

The most preferred embodiments of this invention comprise block copolymers of the following formulae

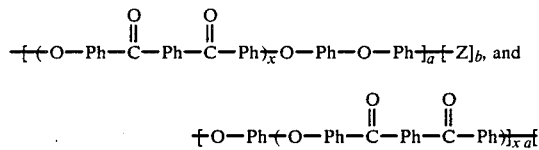

wherein "Ph" is as described above, x is a number of at least 1, preferably at least 3, to a value not in excess of about 1000, a is a number having a value of at least 1, typically not in excess of 100, b is a number at least 1, preferably having a value of at least 2, to a number not in excess of about 100, and Z is a chain extending group selected from one or more of the following:

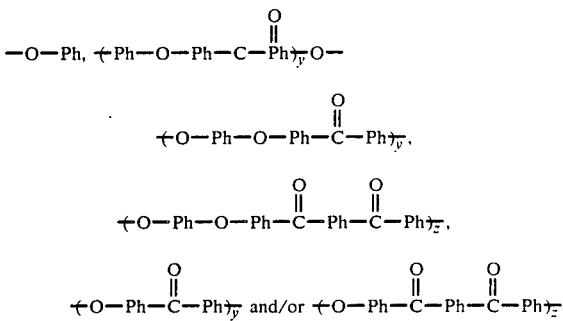

wherein y has a value of at least 1 up to about 50, and z has a value of at least 1 up to about 50.

The Monomers and Oligomers

Novel monomers and oligomers which may be used herein are depicted by the following formulae:

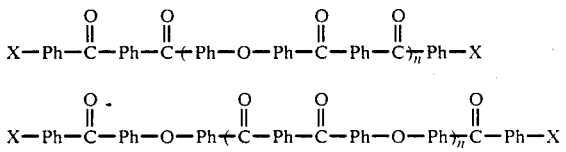

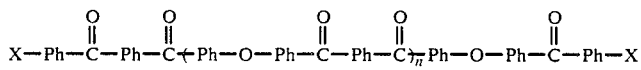

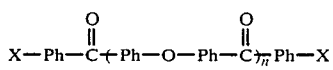

wherein X is halogen, preferably fluorine and n is an integer of from 1 to about 100.

The preferred monomers are represented by the following formulae:

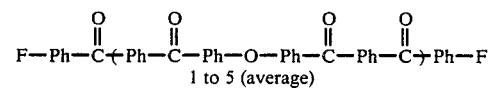
1 to 5 (average)

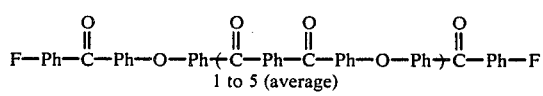
1 to 5 (average)

Preparation of the Block Copolymers and Monomers and/or Oligomers

The block copolymers of this invention may be prepared by one or more of the following solution polymerization processes. These processes utilize precursors prepared as follows:

Starting Materials (I) Functionalized Starting Material prepared via the nucleophilic route (A) Hydroxyl-terminated precursors.

The condensation of monomers such as listed above, i.e., the bisphenols and dihalobenzenoids with optionally added halophenols, can be made to yield hydroxyl-terminated oligomeric precursors. The conditions used for the preparation of these products are the same as set forth in the section titled "Situation I", infra, except that an appropriate excess of the hydroxyl coreactant is used. The higher the excess of coreactant, the lower the molecular weight of the resulting polymer. For example, a polymer having a number average molecular weight of about 5,000 is obtained when one mole of diphenol is reacted with about 0.92 moles of an activated dihalobenzenoid compound. A typical reaction is illustrated by the following:

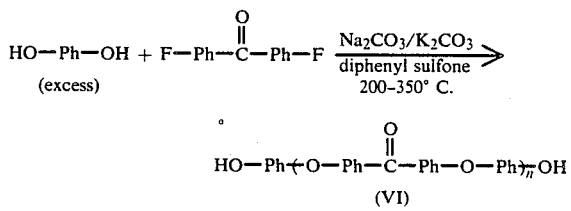
(VI)

Another route to the hydroxyl-terminated precursor is the reaction of an activated halophenol with a diphenol as shown by the following:

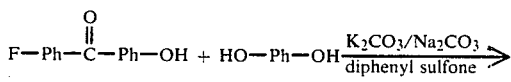

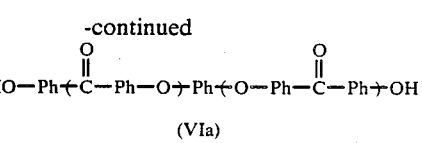
(VIa)

(B) Halogen-terminated precursors.

A similar condensation as described in (A) above is used except that an excess of the activated dihalobenzenoid compound is reacted. The dihalo-terminated precursor is illustrated by the following:

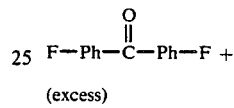
(excess)

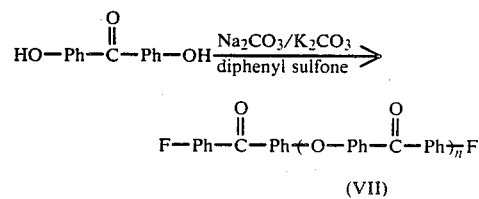
(VII)

In another embodiment, the following reaction may be used:

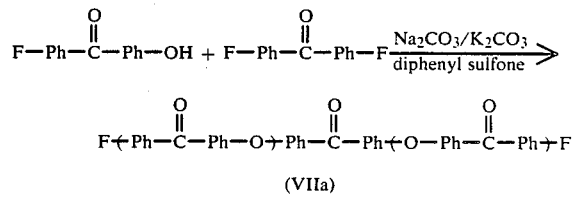
(VIIa)

Since there may be some hydrolysis during the reaction, as shown above, total dihalo termination is accomplished by adding a small additional amount of the same dihalo compound (or optionally, any other activated dihalo compound) to the reaction mixture and heating for about 1 to 2 hours.

(C) Halogen-hydroxy-terminated precursors

These precursors may be prepared by any of the following methods:

(i) Selective hydrolysis of one halo atom in (VII) above, or (ii) The reaction of equimolar amounts of diphenol and dihalo-compounds. In this case reaction time is extremely important as it will eventually control the molecular weight of the precursor. The longer the reaction time, the higher the molecular weight of the precursor. Should hydrolysis occur, termination may be carried out, as described under (B) above (i.e. via the addition of additional dihalo-compound); or (iii) The reaction of precursor (VI) with a calculated amount of a dihalobenzenoid compound; or (iv) The reaction of precursor (VII) with a calculated amount of a diphenol compound. The reaction conditions are as described under Situation I, infra.

(v) The reaction of a halophenol where, once again, the reaction time is very important since it will control the molecular weight of the precursor.

(II) Functionalized materials prepared via the electrophilic route (A) Halogen-terminated The preparation of these materials is illustrated by the reaction of terephthaloyl chloride and diphenyl ether as follows:

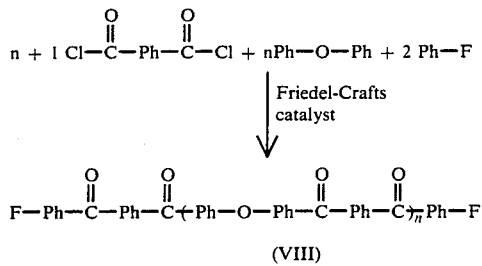

(VIII)

Another embodiment using the same monomers is illustrated as follows:

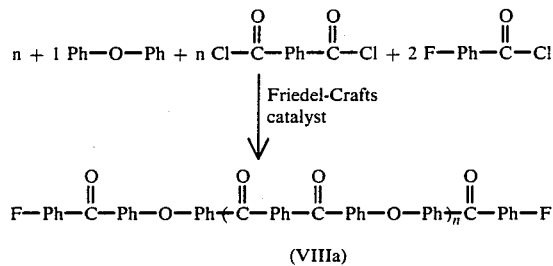

(VIIIa)

Another example is the reaction of diphenyl ether with phosgene as follows:

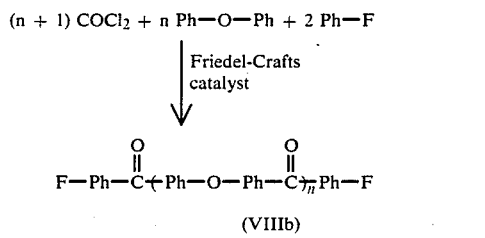

(VIIIb)

or

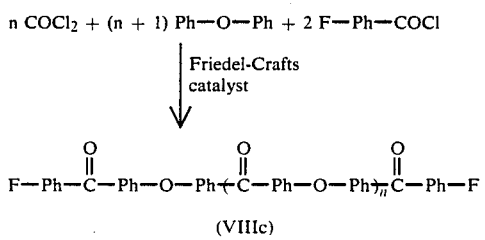

(VIIIc)

Thus the polyketone oligomers may be prepared by reacting an excess of either (i) or (ii):

(i) at least one electrophilic halo acylhalide or diacyl halide of the formula:

$$YOC-A(CO)_aY$$

where —A— is a direct bond or a divalent aromatic radical, Y is halogen and —COY is acylhalide, a is 0 or 1, polymerizable with at least one aromatic compound of (ii) below, and (ii) at least one aromatic compound of the formula:

$$H-Ar'-H$$

where —Ar'— is a divalent aromatic radical and H is an aromatically bound hydrogen atom, which compound is polymerizable with at least one halo acylhalide or diacyl halide of (i), above, followed (when a is 1) by the Friedel-Crafts reaction of the obtained intermediate with Z—Ar$^5$H if excess of (i) is used, or with Z—Ar$^5$-COY if excess of (ii) is used. In the formulae above Z is halogen, preferably fluorine, Y is as defined above, and Ar$^5$ is a divalent, optionally alkyl or aryl substituted arylene group.

Specifically, the precursors may be prepared by reacting any of the well-known aromatic coreactants such as diphenyl sulfide, dibenzofuran, thianthrene, phenoxanthin, dibenzodioxine, phenodioxin, diphenylene, 4,4'-diphenoxybiphenyl, xanthone, 2,2'-diphenoxybiphenyl, 1,4-diphenoxybenzene, 1,3-diphenoxybenzene, 1-phenoxynaphthalene, 1,2-diphenoxynapthalene, diphenoxybenzophenone, diphenoxy dibenzoyl benzene, diphenyl ether, 1,5-diphenoxynapthalene, and the like. Among these, diphenyl ether, diphenyl, diphenyl methane, 1,4-diphenoxy benzene, and 4,4'-diphenoxy diphenyl ether are preferred.

Similarly, the following compounds are diacyl halides which may be used as reactants: terephthaloyl chloride, isophthaloyl chloride, thio-bis(4,4'-benzoyl chloride), benzophenone-4,4'-di(carbonyl chloride), oxy-bis(3,3'-benzoyl chloride), diphenyl-3,3'-di(carbonyl chloride), carbonyl-bis(3,3'-benzoyl chloride), sulfonyl-bis(4,4'-benzoyl chloride), sulfonyl-bis(3,3'-benzoyl chloride), sulfonyl-bis(3,4'-benzoyl chloride), thio-bis(3,4'-benzoyl chloride), diphenyl-3,4'-di(carbonyl chloride), oxy-bis[4,4'-(2-chlorobenzoyl chloride)], naphthalene-1,6-di(carbonyl chloride), napthalene-1,5-di(carbonyl chloride), naphthalene-2,6-di(carbonyl chloride), oxy-bis[7,7'-naphthalene-2,2'-di(carbonyl chloride)], thio-bis[8,8'-naphthalene-1,1-di(carbonyl chloride)], [7,7'-binaphthyl-2,2'-di(carbonyl chloride)], diphenyl-4,4'-di(carbonyl chloride), carbonyl-bis[7,7'-naphthalene-2,2'-di(carbonyl chloride)], sulfonyl-bis[6,6'-napthalene-2,2'-di(carbonyl chloride)], dibenzofuran-2,7-di(carbonyl chloride) and the like.

Illustrative of suitable acyldihalides include carbonyl chloride (phosgene), carbonyl bromide, carbonyl fluoride and oxaloyl chloride.

Preferably, diphenyl ether and/or diphenoxybenzene are reacted with terephthaloyl chloride.

Fluorobenzene and p-fluorobenzoyl chloride, as end-capping agents, have been selected for illustration purposes only. It should be noted that other similar aromatic compounds, e.g.

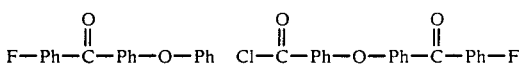

-continued

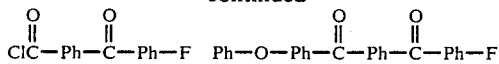

and materials wherein the fluoride is replaced by chloride, bromide, or nitro can be similarly used. Fluorobenzene and p-fluorobenzoyl chloride are preferred.

Self condensation of the following halo-aromatic halides

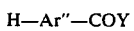

wherein Ar'' is a divalent aromatic radical and H is an aromatically bound hydrogen atom, Y is as defined above, and COY is an aromatically bound acyl halide group which monoacyl halide is self-polymerizable, offers yet another route to these halo-terminated precursors; an example follows:

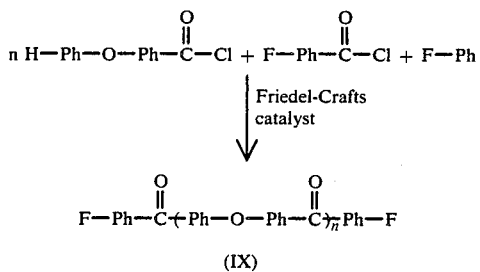

(IX)

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide, titanium tetrachloride, and stanic chloride, can also be used. In the preferred embodiment, excess of up to 100 mole percent of the acid catalyst is used.

The polymerization is generally carried out in the presence of a solvent. The preferred organic solvent is 1,2-dichloroethane. Other solvents such as symmetrical tetrachloroethane, o-dichlorobenzene hydrogen fluoride, methylene chloride, trichloromethane, trichloroethylene, or carbon disulfide may be employed. Cosolvents such as nitromethane, nitropropane, dimethyl formamide, sulfolane, etc. may be used. Concentrations as low as 3 to as high as 40 wt. percent may be used. Generally lower concentrations are preferred when high molecular weight polymers are being prepared. Higher concentrations are preferably used when oligomers are prepared.

The reaction may be carried out over a range of temperatures which are from about −40° C. to about 160° C. In general, it is preferred to carry out the reaction at a temperature in the range of 0° to 30° C. In some cases it is advantageous to carry out the reaction at temperatures above 30° C. or below 0° C. Most preferably, the reactions are carried out at temperatures below 0° C. The reaction may be carried out at atmospheric pressure although higher or lower pressures may be used. Reaction times vary depending on the reactants, etc. Generally, reaction times of up to 6 hours and longer are preferred.

(B) Hydroxyl terminated precursors

Basic hydrolysis using methods known in the art (for example in a mixture of dimethyl sulfoxide and water, diphenyl sulfone and water, aqueous amide aprotic solvents) of the dihalo oligomers should yield the dihydroxy oligomers.

(C) Hydroxyl-Halogen-terminated precursors

Methods very similar to those described under (I)(C) are useful, i.e.

(i) Partial hydrolysis of the dihalo-precursors.

(ii) Reaction of the dihalo-precursor with a diphenol under nucleophilic substitution conditions.

(iii) Reaction of the dihydroxy precursor with an activated dihalobenzenoid compound under conditions of nucleophilic substitution.

(III) Non-functionalized precursors

Using the Friedel-Crafts reaction described above, non-functionalized precursors can be prepared. An example is as follows:

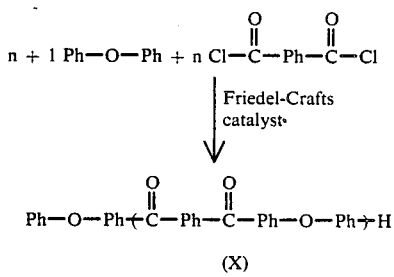

(X)

Obviously, a wide variety of such oligomers are possible by the appropriate selection of the monomers listed above.

Preparation of the Block Copolymers

Situation (I)

The block copolymers may be prepared by a nucleophilic reaction between preformed precursors or polymers having mutually reactive groups as follows:

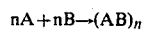

there may be more than two precursors or polymers, used to form the block copolymers, i.e.,:

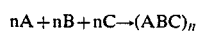

The precursors or polymers may be illustrated by the following:

wherein X is an aryl halide, preferably chlorine or fluorine, and is ortho or para to

and

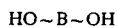

The reaction of these two precursors or polymers forms the block copolymer (AB)$_n$. Alternatively, the precursors or polymers may be illustrated by the following:

HO~B~X

Their condensation will yield a block copolymer. Another alternative is the following:

X~A~X, and

X~B~X which can be reacted with a monomeric material, i.e.,

HO—monomer—OH to give the copolymer; or

HO~A~OH, and

HO~B~OH which can be reacted with a monomeric material, i.e.,

X—monomer—X to give the copolymer.

If A and B are identical their coupling (e.g., the last two cases) must be performed with a difunctional oligomeric agent, i.e,:

HO—OLIGOMER—OH or

X—OLIGOMER—X

Specific examples are as follow:

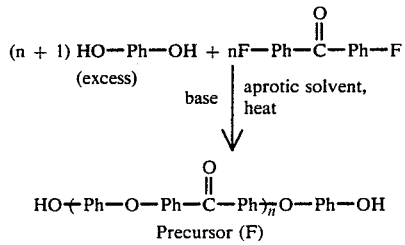
Precursor (F)

or

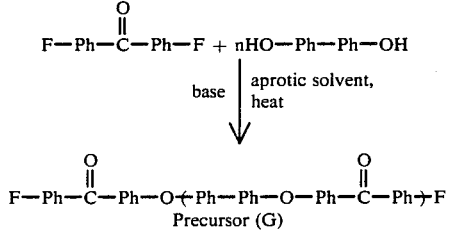
Precursor (G)

The precursors (F) and (G) are prepared using the nucleophilic route. An electrophilically prepared, fluorine-terminated starting material is, for example, the following:

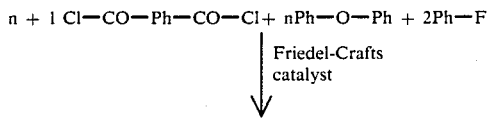

-continued

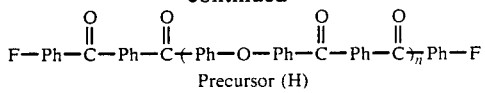
Precursor (H)

The preparation of an oligomeric coupling agent is illustrated below:

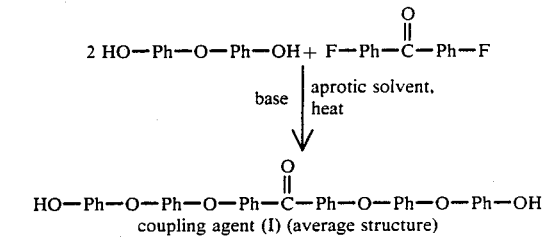
coupling agent (I) (average structure)

The equation below illustrates the coupling of two identical blocks using an oligomeric agent:

$$(G) + (I) \xrightarrow[\text{heat}]{\text{base} \atop \text{aprotic solvent,}} \text{coupled polymer having the blocks of (G) coupled with (I)}$$

Another oligomer that can be prepared is the following:

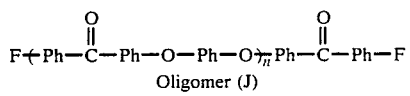
Oligomer (J)

this oligomer is prepared in the same manner as oligomer (F) except that an excess of 4,4'-difluorobenzophenone is used.

The reaction of (J) with (G) in the presence of HO—ph—O—ph—OH will yield a coupled polymer having different blocks.

The reactions are carried out by heating a mixture of the said precursor or precursors with the appropriate monomers (if required) at a temperature of from about 100° to about 400° C. The reactions are conducted in the presence of an alkali metal carbonate or bicarbonate. Preferably a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.01 to about 0.25 gram atoms of the second alkali metal per gram atom of sodium. Of course, it is possible to use the preformed alkali metal salts of diphenols.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g. 100° to 250° C., the water should be removed, e.g. by heating under reduced pressure, prior to reaching the polymerization temperature.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, when using an oligomeric diphenol there should be at least 1 mole of carbonate, or 2 moles of bicarbonate, per mole of the aromatic diol. Likewise where an oligomeric halophenol is employed there should be at least 0.5 mole of carbonate, or 1 mole of bicarbonate, per mole of the halophenol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above the amount of the second (higher) alkali metal carbonate or bicarbonate employed is such that there are 0.001 to about 0.2 grams atoms of the alkali metal of higher atomic number per gram atom of sodium.

Thus when using a mixture of carbonates, e.g. sodium carbonate and cesium carbonate, there should be 0.1 to about 20 moles of cesium carbonate per 100 moles of sodium carbonate. Likewise when using a mixture of a bicarbonate and a carbonate, e.g. sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

Preferably, from 0.001 to 0.2 gram atoms of the alkali metal of the second alkali metal carbonate or bicarbonate per gram atom of sodium is used.

Where an oligomeric bisphenol and oligomeric dihalobenzenoid compound are employed, they should be used in substantially equimolar amounts. An excess of one over the other leads to the production of lower molecular weight products. However a slight excess, up to 5 mole %, of the dihalide may be employed if desired.

The reaction is carried out in the presence of an inert solvent. Preferably, the solvent is an aliphatic or aromatic sulphoxide or sulphone of the following formula

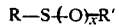

where x is 1 or 2 and R and R' are alkyl or aryl groups and may be the same or different. R and R' may together form a divalent radical. Preferred solvents include dimethyl sulphoxide, dimethyl sulphone, sulpholane(1,1 dioxothiolan), or aromatic sulphones of the formula:

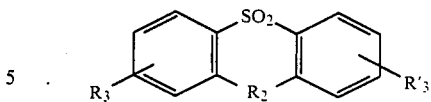

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulphones include diphenylsulphone, dibenzothiophen dioxide, phenoxathiin dioxide and 4-phenylsulphonyl biphenyl. Diphenylsulphone is the preferred solvent. Other solvents that may be used include benzophenone, N,N'-dimethyl acetamide, N,N-dimethyl formamide and N-methyl-2-pyrrolidone.

The polymerization temperature is in the range of from about 100° to about 400° C. and will depend on the nature of the reactants and the solvent, if any, employed. The preferred temperature is above 270° C. The reactions are generally performed under atmospheric pressure. However, higher or lower pressures may be used.

For the production of some polymers, it may be desirable to commence polymerization at one temperature, e.g. between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The polymerization reaction may be terminated by mixing a suitable end capping reagent, e.g. a mono or polyfunctional halide such as methyl chloride, difluorobenzophenone, monofluoro benzophenone, 4,4'-dichlorodiphenylsulphone with the reaction mixture at the polymerization temperature, heating for a period of up to one hour at the polymerization temperature and then discontinuing the polymerization.

This invention is also directed to an improved process for making the block polymers. Specifically, this process is directed to preparing poly(aryl ether ketone) precursors and the block polymer by the reaction of a mixture of at least one bisphenol and at least one dihalobenzenoid compound, or a halophenol to make the precursor, or the reaction of the precursor to make the block polymer either one or both in the presence of a combination of sodium carbonate and/or bicarbonate an alkali metal halide selected from potassium, rubidium, or cesium fluoride or chloride, or combinations thereof.

The reaction is carried out by heating a mixture of one or more bisphenols and one or more dihalobenzenoid compounds or halophenols or the block precursor and other reactants, as described herein, at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate or bicarbonate and potassium, rubidium or cesium fluoride or chloride, or combinations thereof employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from a higher alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. In this respect, cesium is a more active metal and potassium is a less active metal so that less cesium and more potassium are used. Further, the chloride salts are less active than the fluoride salts so that more chloride and less fluoride is used.

Where a bisphenol and dihalobenzenoid compound are employed, they should be used in substantially equimolar amounts when maximum molecular weight is sought. However a slight excess, up to 5 mole %, of dihalide may be employed if desired. An excess of one over the other leads to the production of low molecular weight products which can be desirable when the process is directed to making lower molecular weight PAEK, for example, the precursors for block polymer formation.

The reactions are carried out in the presence of an inert solvent.

The reaction temperature is in the range of from about 100° to about 400° C. and will depend on the nature of the reactants and the solvent. The preferred temperature is above 250° C. The reactions are preferably carried out at ambient pressure. However, higher or lower pressure can also be used. The reaction is generally carried out in an inert atmosphere.

For the production of some block polymers it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

Situation (II)

The block copolymers of this invention may be prepared by a nucleophilic polycondensation reaction between a precursor or polymer and one or more monomers.

The various combinations possible in this situation are illustrated below:

IIa. HO~A~OH is reacted with

to give the block copolymer; or

IIb. X~A~X is reacted with

to yield the block copolymer.

IIc. Still another possibility is the following:

HO~A~OH is reacted with

or

X~A~OH is reacted with

X—monomer—X and

HO—monomer—OH or

X~A~X is reacted with

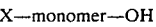

or

X~A~OH is reacted with

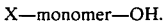

IId. Triblock copolymers could, for instance, be obtained via the route shown

X~A~X+

HO~B~OH+X—monomer—OH

Such situations arise in particular where A and B have the same composition, or if the polymer block obtained form X—monomer—OH is identical to one of the precursors.

Numerous other possibilities that are obvious to those skilled in the art exist.

Additionally, the block copolymer may be prepared from a preformed polymer and an oligomer via coupling and transetherification. The process conditions in Situation II are the same as discussed for Situation I.

Situation III

The block copolymers of this invention may also be prepared by Friedel-Crafts (electrophilic) polymerization techniques as fully described above. The preparation of a block copolymer (AB)$_n$ will be illustrated by the use of diphenyl ether and terephthaloyl chloride as follows:

(a) where x>y

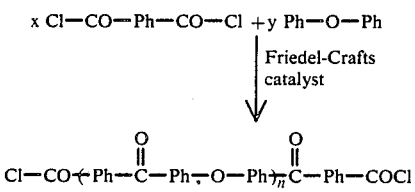

An acid chloride terminated oligomer (K)

OLIGOMER (K) + one block

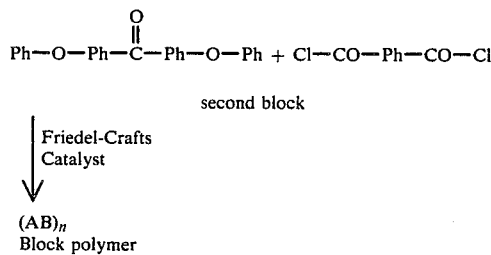

second block

| Friedel-Crafts
| Catalyst
↓

(AB)$_n$
Block polymer (b) where y>x

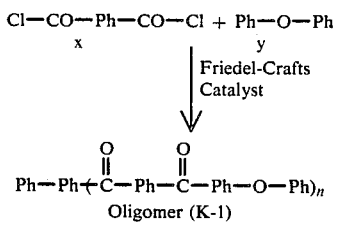

Oligomer (K-1) + one block

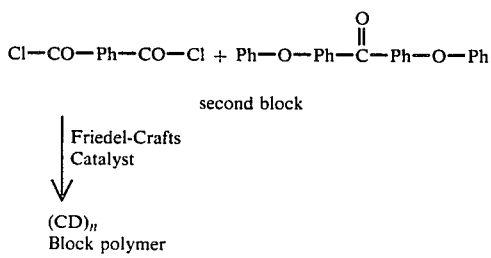

second block

| Friedel-Crafts
| Catalyst
↓

(CD)$_n$
Block polymer

Obviously, each oligomer can also be prepared in a separate step and then reacted with the other oligomer.

Situation V

Poly(ether ketone) based block copolymers can be prepared using the non-functionalized oligomers of the type (X). Both nucleophilic and electrophilic (Friedel-Crafts) condensation are possible.

(a) The nucleophilic polycondensation

The solution condensation of hydroquinone and 4,4'-difluorobenzophenone is the presence of oligomer (X) will yield a copolymer due to a transetherification process accompanying polymer formation. This is schematically represented as follows:

(X) + HO—Ph—OH +

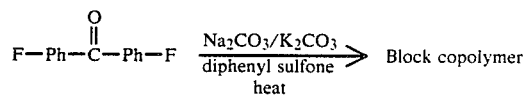

There are numerous possibilities for reagent selection; thus, a wide number of structures is available.

(b) Electrophilic (Friedel-Crafts) Polycondensation

Oligomer (X) or any other non-functional oligomer of the type

can be made to react in a Friedel-Crafts polycondensation as shown below using terephthaloyl chloride and 1,4-diphenoxybenzene (wherein Ar and Ar' are as defined above and Ar$^6$ is a monovalent aryl group such as phenyl):

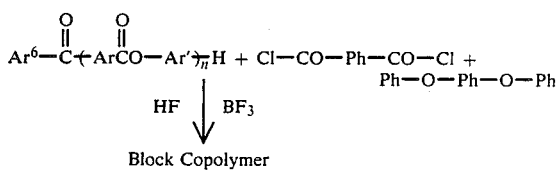

Block Copolymer where HAr'H is, for example, Ph—O—Ph and Ar is, for example, Ph.

Obviously, once again, numerous possibilities exist and are obvious to those skilled in the art. The various nucleophilically and electrophilically prepared precursors listed above can all be utilized in this variant.

The copolymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, organic polyamide fibers, and the like may be used. The copolymers may also include additives such as titanium dioxide; thermal stabilizers, ultraviolet light stabilizers, processing aids, plasticizers, and the like.

The copolymers of this invention may be fabricated into any desired shape, i.e., moldings, coatings, films, or fibers. They are particularly desirable for use as electrical insulation for electrical conductors.

Also, the copolymers may be woven into monofilament threads which are then formed into industrial fabrics by methods well known in the art as exemplified by U.S. Pat. No. 4,359,501. Further, the copolymers may be used to mold gears, bearings and the like.

EXAMPLES

The following examples serve to give specific illustrations of the practice of this invention but they are not intended in any way to limit the scope of this invention.

Example 1

A 2 liter, 3 neck, round bottom flask was equipped with a mechanical stirrer, a nitrogen inlet, condenser and a thermometer. The flask was charged with 19.28 g (0.095 moles) of terephthaloyl chloride, 1.02 g (0.005 moles) of isophthaloyl chloride, 0.42 g (0.003 moles) of benzoyl chloride, 17.25 g (0.1015) moles of diphenyl ether and 700 mls of 1,2-dichloroethane. This solution was cooled to 5° C. in an ice water bath. Aluminum chloride (34.76 g, 0.260 moles) was added in portions while maintaining the temperature below 10° C. The resulting reaction mixture was held at 5°–10° C. for 6 hours. After ~30 minutes a precipitate formed. At the end of 6 hours the ice bath was removed and the reaction mixture was allowed to warm to ambient temperatures (~25° C.) where it was held for an additional 16 hours. The reaction mixture was poured into 3 liters of ice water containing 100 ml of concentrated hydrochloric acid. The resulting three phase system was heated to ~85° C. to distill the 1,2-dichloroethane. The polymer was isolated by filtration, washed with water (2×500 ml) and methanol (2×500 ml) and dried in a vacuum oven at 100° C. The product had a reduced viscosity of 0.58 dl/g as measured in concentrated sulfuric acid at 25° C. and a concentration of 1 g/100 ml.

Example 2

A 250 ml glass resin reactor was equipped with a mechanical stirrer, nitrogen sparge tube, thermocouple, Dean Stark trap and condenser. To the reactor were charged, 16.35 g. (0.075 moles) of 4,4′-difluorobenzophenone, 8.25 g (0.075 moles) of hydroquinone, 5.40 g of a crystalline polyaryletherketone prepared in Example 1 and having the structural repeat unit (XI), 7.70 g. (0.073 moles) of sodium carbonate,

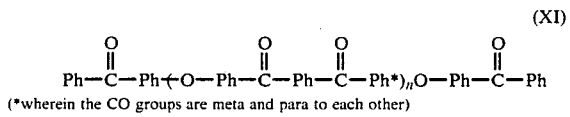
(XI)

(*wherein the CO groups are meta and para to each other)

0.53 g (0.004 moles) of potassium carbonate and 63 g of diphenyl sulfone. The system was purged with nitrogen for 1 hour at room temperature and heated to 200° C. After 1 hour at 200° C. and 15 minutes at 250° C. the reaction was carried out at a temperature of 320° C. for 1 hour. The viscous reaction mixture was poured hot from the reactor, allowed to solidify and then finely ground. The product was refluxed in acetone (700 ml), followed by 1N hydrochloric acid solution (700 ml); it was then washed with water (2 times using 500 ml) and acetone (2 times using 500 ml) at room temperature. The product was dried in a vacuum oven at 100° C. for 24 hours. The final polymer had a reduced viscosity of 2.16 dl/g (in concentrated sulfuric acid at 1 g/100 ml and 25° C.) C$^{13}$ nuclear magnetic resonance (nmr) spectroscopy indicated the presence of the following blocks in the polymer:

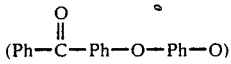

and

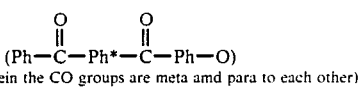
(*wherein the CO groups are meta amd para to each other)

Example 3

A four neck 250 ml glass resin kettle was equipped with a mechanical stirrer, nitrogen inlet, thermocouple and a Dean Stark trap with fitted condenser. Into the kettle was charged 24.63 g (0.0765 moles) of 1,4-bis(p-fluorobenzoyl)benzene, 8.25 g (0.0750 moles) of hydroquinone, 7.70 g (0.0727 moles) of sodium carbonate, 0.53 g. (0.0038 moles) of potassium carbonate and 68.6 g of diphenyl sulfone. After purging the reaction mixture with nitrogen for 1 hour at room temperature, it was heated to 200° C. and held there for 1 hour. The temperature was raised to 250° C. and held for 15 minutes and then to 320° C. for 2 hours. The reaction mixture was poured into an aluminum pan, solidified and ground into fine particles. The particles were refluxed in acetone for 1.5 hours and in hydrochloric acid for 1.5 hours and then washed in a blender with water (2×500 ml) and acetone (2×500 ml). The resulting polymer powder was dried in a vacuum oven overnight (about 12 hours) at 100° C. The polymer has a reduced viscosity of 0.83 dl/g as measured in concentrated sulfuric acid at 1 g/100 ml and 25° C.

Example 4

Example 2 was repeated except that the crystalline polyaryletherketone (XII) prepared in Example 3 and having the following structure

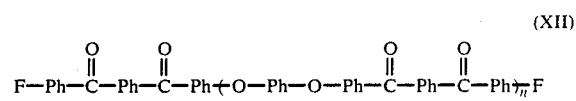
(XII)

was substituted for precursor (XI) in the initial charge. The final block copolymer had a reduced viscosity of 1.71 dl/g as measured in concentrated sulfuric acid, 1 g/100 ml at 25° C. and contained the following blocks:

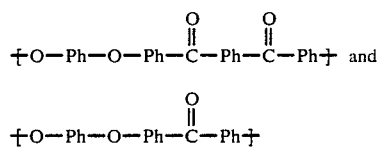

Example 5

To the apparatus described in Example 2 were charged 32.20 g (0.100 moles) of 1,4 bis(4-fluorobenzoyl)benzene, 11.01 g (0.100 moles) of hydroquinone, 9.80 g of crystalline polyaryletherketone XI, 10.28 g (0.097 moles) of sodium carbonate, 0.69 g (0.005 moles) of potassium carbonate and 61.50 g of diphenyl sulfone. The reaction conditions and work up were the same as in Example 1. The final block copolymer had a reduced viscosity of 1.44 dl/g and contained the following blocks:

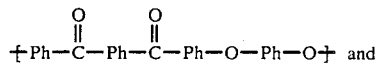

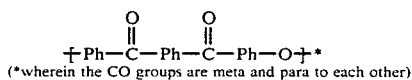
(*wherein the CO groups are meta and para to each other)

Example 6

A 250 ml 3-neck flask with slanted side arms fitted with a Claisen arm, nitrogen inlet tube, thermocouple probe, condenser, and stainless steel stirrer was charged with diflurobenzophenone (0.1104 mole, 24.09 gm), hydroquinone (0.115 mole, 12.66 gm), sodium carbonate (0.1173 moles, 12.43 gm, ground and dried), anhydrous potassium fluoride (0.0293 mole, 1.70 gm) and diphenyl sulfone (100 gm). The apparatus was evacuated and filled with argon by means of a Firestone valve connected to the top of the condenser. A flow of high purity nitrogen was begun and the connection to the Firestone valve was replaced with a bubbler. The contents of the flask was heated carefully by means of a heating mantle and temperature controller to melt the diphenyl sulfone. The reaction mixture was stirred and heated to 200° C. and held 30 minutes, held at 250° C. for 1 hour, and finally at 270° C. for 2 hours. The reaction mixture was poured from the reaction flask, cooled, ground to a fine powder, and a sample refluxed successively twice with acetone, once with 2% hydrochloric acid, once with water, and washed thoroughly with acetone. The dried (120°, vacuum oven) sample gave a reduced viscosity (1% in conc. sulfuric acid, 25° C.) of 0.53 dl/gm. Based on reactant stoichiometry this oligomer had the following structure:

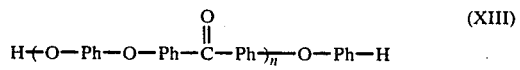
(XIII)

Example 7

The oligomer was prepared essentially as in Example 6 except less potassium fluoride (0.01465 moles, 0.85 gm) was used and the reaction mixture was heated at 200° for 30 minutes, at 250° C. for 1 hour, and then at 290° C. for 2 hours. The isolated oligomer had a reduced viscosity of 0.51 dl/gm (concentrated sulfuric acid, 1 gm/100 ml at 25° C.).

Example 8

A 2000 ml flask was fitted with a mechanical stirrer, nitrogen sparge tube, thermometer, reflux condenser and gas outlet connected to an aqueous sodium hydroxide trap. The apparatus was purged with nitrogen and while under a positive pressure was charged with 1400 ml of 1,2-dichloroethane, 2.03 g (0.010 moles) of isophthaloyl chloride, 38.57 g (0.190 moles) of terephthaloyl chloride, 35.74 g (0.210 moles) of diphenylether and 3.17 g (0.020) moles of p-fluorobenzoyl chloride. The mixture was cooled to 0° C. as 12.80 g (0.546 moles) of aluminum trichloride was added at a rate such as not to exceed 5° C. After 6 hours at 0° C., the heterogeneous slurry was allowed to warm to room temperature (about 25° C.) and stirred for an additional 17 hours. The excess solvent was decanted and the precipitate was added to dilute aqueous acid (3000 ml H₂O/100 ml hydrochloric acid conc.) and heated to reflux for 2 hours while the 1,2-dichloroethane was continuously removed. The polymer was filtered and dried in a vacuum at 60° C. for 24 hours to give 60.2 grams of the final polymer having a general structure as shown in formula (IV). The polymer had a reduced viscosity of 0.34 dl/g as measured in sulfuric acid at a concentration of 1 g/100 ml at 25° C.

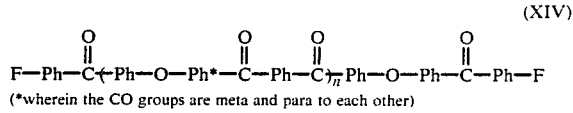
(*wherein the CO groups are meta and para to each other)

Example 9

A 250 ml glass resin reactor was equipped with a mechanical stirrer, nitrogen sparge tube, thermocouple, Dean Stark trap, condenser and a pressure equalizing dropping funnel. To the reactor were charged 16.51 g (0.076 moles) of 4,4'difluorobenzophenone, 5.41 g of a difluoro end capped crystalline poly(aryl ether ketone) prepared as in Example 8, 8.25 gms (0.075 moles) of hydroquinone, 7.70 g (073 moles) of sodium carbonate, 0.53 g (0.004 moles) of potassium carbonate, 63 g of diphenyl sulfone and xylene. The apparatus was evacuated then charged with nitrogen. This procedure was repeated 3 additional times. While being continuously purged with nitrogen, the mixture was heated to 200° C. for 1 hour followed by 15 minutes at 250° C. During this time the xylene was continuously replenished. The reaction was carried out at a temperature of 320° C. for 1 hour resulting in a viscous reaction mixture which was poured hot from the reactor, allowed to solidify, and then ground finely. The product was refluxed in acetone (700 ml), followed by 1N aqueous hydrochloric acid solution (700 ml). It was then washed with water (5 times using 500 ml) at room temperature. The product was dried in a vacuum oven at 100° C. for 24 hours. The final polymer had a reduced viscosity of 1.34 dl/g (in concentrated sulfuric acid at 1 g/100 ml and 25° C.).

Example 10

A 1000 ml flask was fitted with a mechanical stirrer, reflux condenser, thermometer, nitrogen sparge tube, and gas outlet connected to an aqueous sodium hydroxide trap. The apparatus was purged with nitrogen and while under a positive pressure was charged with 85.11 g (0.500 moles) of diphenylether, 68.01 g (0.335 moles) of terephthaloyl chloride, 53.12 g (0.335 moles) of p-fluorobenzoyl chloride and 600 mls of 1,2-dichloroethane. The mixture was cooled to 0° C. as 174.21 g (1.31 moles) of aluminum trichloride was added at a rate such as not to exceed 5° C. After 6 hours at 0° C. the viscous homogeneous mixture was allowed to warm to room temperature and stirring was continued for an additional 17 hours. The entire mixture was then poured into dilute aqueous acid (3000 ml of H₂O/100 ml hydrochloric acid conc.), refluxed with continuous removal of 1,2-dichloroethane and filtered. The precipitate was refluxed in 5% hydrochloric acid (700 ml), filtered, washed at room temperature with distilled water (2 times using 500 ml) and methanol (2 times using 500 ml) and dried in a vacuum at 100° C. for 24 hours. The final oligomeric crystalline poly(aryletherketone) had the structural formula (V) and was characterized by $^{13}$C NMR, by mass spectroscopy and elemental analysis.

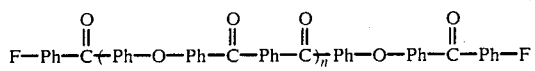

(XV)

Example 11

A 250 ml flask was fitted with a mechanical stirrer, nitrogen inlet, thermocouple-controller, Dean Stark trap with a condenser and an addition funnel. The flask was charged with 11.01 gms (0.1000 moles) of hydroquinone, 21.93 gms (0.1005 moles) of 4,4'-difluorobenzophenone, 10.28 gms (0.0970 moles) of anhydrous sodium carbonate, 0.691 gms (0.0050 moles) of anhydrous potassium carbonate, 86.5 gms of diphenyl sulfone, and 35 ml of xylene. The equipment was then evacuated and filled with nitrogen (three times).

Heat was applied to raise the temperature to 200° C. for one hour, the temperature was then raised to 250° C. and held for fifteen minutes, and raised to 320° C. The xylene addition was stopped and 7.21 gms of a poly(ether ketone) with a reduced viscosity of 1.46 dl/gm (measured in sulfuric acid at a concentration of 1 g/100 ml at 25° C.) was added. The poly(ether ketone) was prepared by the aluminum chloride catalyzed condensation of terephthaloyl chloride with diphenyl ether and a small amount of benzoyl chloride. The polymerization was continued for one hour at 320° at which point the reaction mixture was very thick. Methyl chloride (0.5 gms) was added through the nitrogen inlet (below the liquid surface) and the reaction mixture was then dumped into a stainless steel pan.

The cooled solid mass was ground to a granular material which was extracted with two portions of boiling acetone followed by two portions of boiling water. After drying in vacuo, the reduced viscosity was 1.37 dl/gm (1% in conc. sulfuric acid, 25° C.).

The polymer was compression molded (20 mil) and tested for tensile strength and modulus according to ASTM D-638, elongation at break according to ASTM D-638 and pendulum impact strength according to ASTM D-256. The results are as follows:

| | |
|---|---|
| Tensile modulus (psi) | 390,000 |
| Tensile strength (psi) | 13,000 |
| Elongation at break (%) | 6 |
| Pendulum impact (ft-lb/in$^3$) | 83 |

Example 12

A 500 ml flask was fitted with a mechanical stirrer, nitrogen sparge tube, thermometer, reflux condenser and gas outlet connected to an aqueous sodium hydroxide trap. The apparatus was purged with nitrogen and while under a positive pressure of nitrogen was charged with 11.40 g (0.067 moles) of diphenyl ether, 20.30 g (0.100 moles) of terephthaloyl chloride and 270 ml of fluorobenzene. The mixture was cooled to 0° C. as 34.67 g (0.260 moles) of aluminum trichloride was added at such a rate as not to exceed 5° C. After stirring at 0° C. for 6 hours the reaction mixture was allowed to warm to 25° C. and stirring continued for an additional 17 hours. The resultant reaction mixture was poured into dilute aqueous acid (3000 ml water/100 ml hydrochloric acid conc.) and refluxed with continuous removal of the excess fluorobenzene. The resultant precipitate was filtered, refluxed in 5% hydrochloric acid (700 ml), filtered, washed with water (2 times using 500 ml), followed by methanol (2 times using 500 ml) at room temperature and dried in vacuum at 100° C. for 24 hours. The final oligomeric crystalline poly(aryl ether ketone) material having the structural formula (I) was identified by $^{13}$C NMR and confirmed by mass spectroscopy.

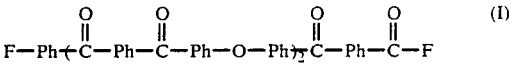

(I)

Example 13

A 500 ml flask was fitted with a mechanical stirrer, nitrogen sparge tube, thermometer, reflux condenser, and gas outlet connected to an aqueous sodium hydroxide trap. The apparatus was purged with nitrogen and while under a positive pressure was charged with 40.60 g (0.200 moles) of terephthaloyl chloride, 22.80 g (0.134 moles) of diphenyl ether and 220 mls of 1,2-dichloroethane. The resultant mixture was cooled to 0° C. as 69.34 g (0.520 moles) of aluminum trichloride was added at such a rate as not to exceed 5° C. After stirring for 6 hours at 0° C. 25.75 g (0.268 moles) of fluorobenzene was added and the mixture was allowed to warm to 25° C. and stirring continued for an additional 17 hours. The entire mixture was then poured into dilute aqueous acid (3000 ml water/100 ml hydrochloric acid conc.) and refluxed with the continuous removal of 1,2-dichloroethane and excess fluorobenzene. The resultant precipitate was collected via filtration, refluxed in 5% hydrochloric acid (700 ml), filtered, washed with water (2 times using 500 ml) followed by methanol (2 times using 500 ml) at room temperature and dried in a vacuum at 100° C. for 24 hours. The final oligomeric crystalline poly(aryl ether ketone) having the structural formula (I) was characterized by $^{13}$C NMR and confirmed by mass spectroscopy.

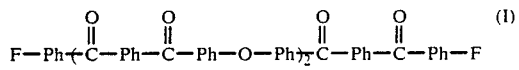

(I)

Example 14

A 250 ml flask was fitted with a mechanical stirrer, nitrogen sparge tube, thermometer, reflux condenser, and gas outlet connected to an aqueous sodium hydroxide trap. The apparatus was purged with nitrogen and while under positive pressure was charged with 96 ml of 1,2-dichloroethane, 11.40 g (0.067 moles) of diphenyl ether, 20.30 g (0.100 moles) of terephthaloyl chloride and 6.44 g (0.067 moles) of fluorobenzene. The mixture was cooled to 0° C. as 34.67 g (0.260 moles) of aluminum trichloride was added at such a rate as not to exceed 5° C. After 6 hours at 0° C. the heterogeneous slurry was allowed to warm to room temperature and stirring was continued for an additional 17 hours. The entire mixture was then poured into dilute aqueous acid (300 ml water/100 ml hydrochloric acid conc.) and refluxed for 2 hours with the continuous removal of 1,2-dichloroethane. The resultant precipitate was collected via filtration, refluxed in 5% hydrochloric acid (700 ml), filtered, washed in a blender with distilled water (2 times using 500 ml) followed by methanol (2 times using 500 ml) at room temperature and dried in a vacuum at 100° C. for 24 hours. The final oligomeric crystalline poly(aryl ether ketone) having the structural formula (I) was characterized by $^{13}$C NMR and confirmed by mass spectroscopy.

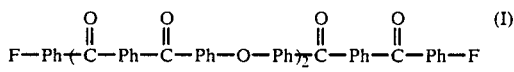

Example 15

A 100 ml flask was fitted with a mechanical stirrer, reflux condenser, thermometer, nitrogen sparge, and gas outlet connected to an aqueous sodium hydroxide trap. The apparatus was purged with nitrogen and while under a positive pressure was charged with 17.02 g (0.100 moles) of diphenyl ether, 10.15 g (0.050 moles) of terephthaloyl chloride, 15.86 g (0.100 moles) of p-fluorobenzoyl chloride and 48 mls of 1,2-dichloroethane. The mixture was cooled to 0° C. as 34.67 g (0.260 moles) of aluminum trichloride was added at such a rate as not to exceed 5° C. After 6 hours at 0° C. the viscous homogeneous mixture was allowed to warm to room temperature and stirring continued for an additional 17 hours. The entire mixture was then poured into dilute aqueous acid (1300 ml water/50 ml hydrochloric acid conc.), refluxed with continuous removal of 1,2-dichloroethane, and filtered. The precipitate was refluxed in 5% hydrochloric acid (700 ml), filtered, washed at room temperature with water (2 times using 500 ml) and methanol (2 times using 500 ml) and dried in a vacuum at 100° C. for 24 hours. The final oligomeric crystalline poly(aryl ether ketone) having the structural formula (I) was characterized by $^{13}$C NMR and confirmed by mass spectroscopy and elemental analysis.

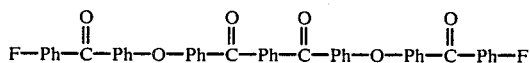

Example 16

A 500 ml flask was fitted with a mechanical stirrer, reflux condenser, thermometer, nitrogen sparge tube, and gas outlet fitted to an aqueous sodium hydroxide trap. The apparatus was charged with 185 ml of o-dichlorobenzene, 34.04 g (0.20 moles) of diphenyl ether, 27.20 g (0.134 moles) of terephthaloyl chloride, 21.25 g (0.134 moles) of p-fluorobenzoyl chloride and 29.39 g (0.402 moles) of N,N-dimethyl formamide. The mixture was cooled to 0° C. as 139.37 g (1.045 moles) of aluminum trichloride was added at such a rate as not to exceed 20° C. After completion of the addition, the mixture was warmed to room temperature and stirring continued for an additional 17 hours. The entire mixture was then added to stirring methanol (1.5 l), filtered, added to delute aqueous acid (3000 ml water/100 ml hydrochloric acid conc.) and refluxed for 2 hours. The resultant precipitate was collected by filtration and washed in a blender with water (2 times 500 ml), methanol (2 times 500 ml), filtered and dried in a vacuum at 100° C. for 24 hours. The final oligomer having the structural formula (I) was characterized by $^{13}$C NMR and confirmed by mass spectroscopy.

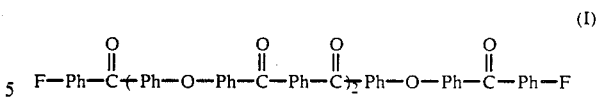

Example 17

A 500 ml flask was fitted with a mechanical stirrer, reflux condenser, nitrogen sparge tube, thermometer and gas outlet connected to an aqueous sodium hydroxide trap. The apparatus was purged with nitrogen and while under a positive pressure was charged with 200 ml of 1,2-dichloroethane, 27.20 g (0.134 moles) of terephthaloyl chloride, 34.04 g (0.200 moles) of diphenyl ether, 21.25 g (0.134 moles) of p-fluorobenzoyl chloride, and 96.62 g (0.804 moles) of sulfolane. The mixture was cooled to 0° C. as 187.61 g (1.407 moles) of aluminum trichloride was added at such a rate as not to exceed 5° C. After 6 hours at 0° C., the viscous homogeneous reaction mixture was allowed to warm to room temperature and stirring continued for an additional 17 hours. The entire mixture was then poured into dilute aqueous acid (3000 ml water/100 ml hydrochloric acid conc.) and heated to reflux for 2 hours while the 1,2-dichlroethane was continuously removed. The resultant precipitate was collected by filtration, then added to 5% hydrochloric acid and refluxed for 2 hours, filtered, washed in a blender with water (2 times using 500 ml) and methanol (2 times using 500 ml), then dried in a vacuum at 100° C. for 24 hours. The final oligomer having the structure formula (I) was characterized by $^{13}$C NMR and confirmed by mass spectroscopy and chemical analysis.

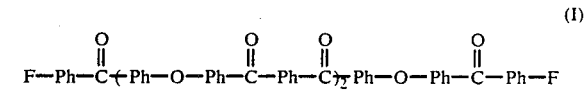

Example 18

A 1000 ml flask was fitted with a mechanical stirrer, nitrogen sparge tube, thermocouple, reflux condenser and gas outlet connected to an aqueous sodium hydroxide trap. The apparatus was purged with nitrogen and while under a positive pressure was charged with 700 ml of 1,2-dichloroethane, 1.02 g (0.005 moles) of isophthaloyl chloride, 19.28 g (0.095 moles) of terephthaloyl chloride, 17.87 g (0.105 moles) of diphenyl ether, 1.59 g (0.010 moles) of p-fluorobenzyl chloride, and 50.47 (0.420 moles) of sulfolane. The mixture was cooled to 0° C. as 98.00 g (0.735 moles) of aluminum trichloride was added at such a rate as not to exceed 5° C. After 6 hours at 0° C. the deep red solution was allowed to warm to room temperature and stirring continued for an additional 17 hours. The entire reaction mixture was poured into dilute aqueous acid (3000 ml water/100 ml hydrochloric acid conc.) and heated to reflux for 2 hours while the 1,2-dichloroethane was continuously removed. The final polymer was filtered and dried in a vacuum at 60° C. for 24 hours to give 30.60 grams of the final polymer having a reduced viscosity of 0.35 dl/g as measured in concentrated sulfuric acid (1 g/100 ml) at 25° C.

What is claimed is:

1. A crystalline tough poly(aryl ether ketone) block or chain extended polymer having the formula:

—(A)ₐXₐ(B)ᵦ]_c wherein A and B are a crystalline poly(aryl ether ketone), a and b are integers of at least 2, c is an integer of 1 or greater, d is 0 or 1, X is a monomeric —Ar'''—O— unit where Ar''' is a divalent arylene radical or an oligomeric radical, with the proviso that when A and B are identical, X is an oligomeric radical.

2. A polymer as defined in claim 1, wherein Ar''' is p-phenylene and the oligomeric radical is Ar''''—O_n wherein n is at least two to about 50 and Ar'''' is a divalent arylene group.

3. The crystalline poly(aryl ether ketone) of claim 1 which contains repeating units of one or more of the following formula:

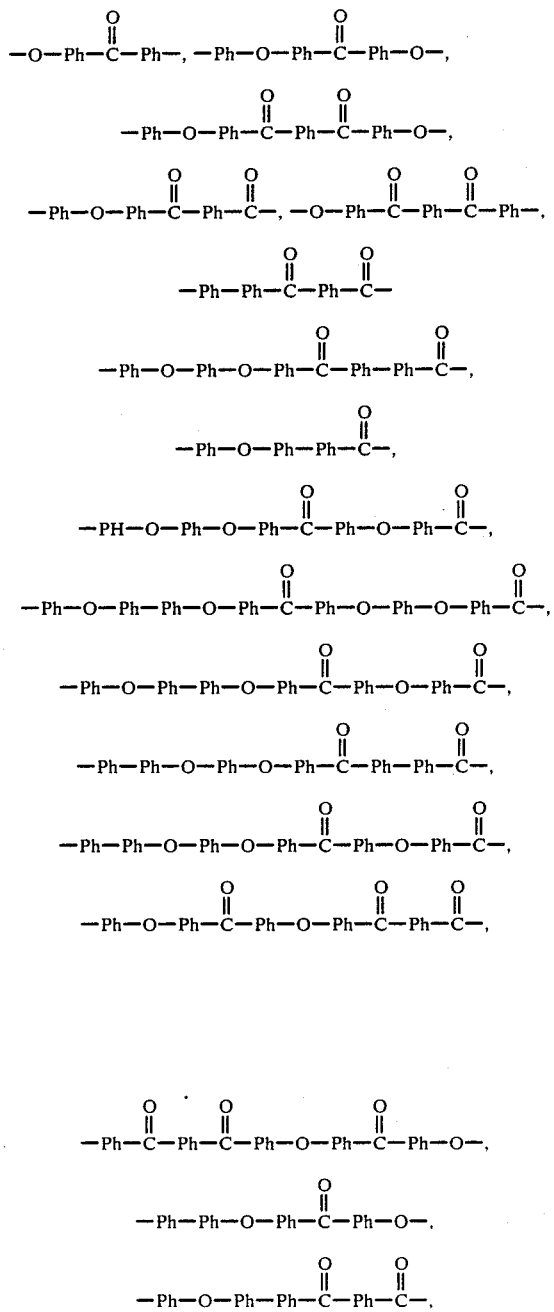

-continued

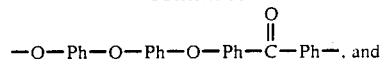

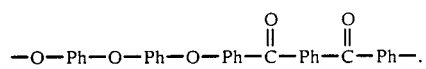

Ph is 1,4 phenylene with the proviso that where there are two carbonyl groups attached to the same Ph, up to 50 percent of these groups can be in the 1,3 position to each other.

4. A block or chain extended polymer as defined in claim 1 of the following formula:

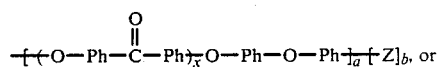

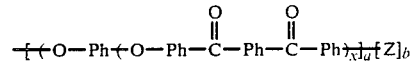

wherein Ph is 1,4-phenylene, x is a number of at least 1, a is a number having a value of at least 1, typically not in excess of 3, b is a number at least 1 to a number not in excess of about 50, and Z is a chain extending group selected from one or more of the following:

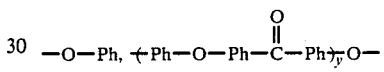

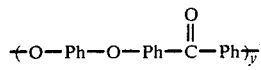

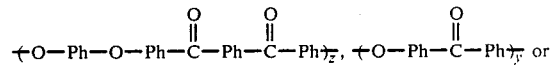

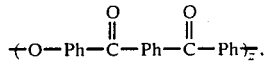

wherein y has a value of at least 1, and z has a value of at least 1, with the proviso that where there are two carbonyl groups attached to the same Ph, up to 50 percent of these groups can be in the 1,3 position to each other.

5. A polymer as defined in claims 1 or 4 of the following formula:

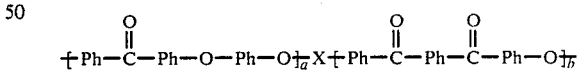

6. A polymer as defined in claims 1 or 4 of the following formula:

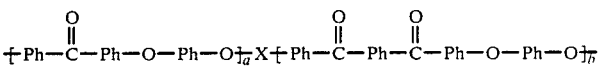

7. A polymer as defined in claims 1 or 4 of the following formula:

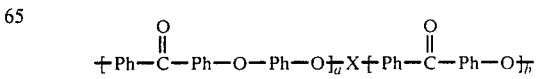

8. A polymer as defined in claims 1 or 4 of the following formula:

$$+Ph-\overset{O}{\overset{\|}{C}}-Ph-\overset{O}{\overset{\|}{C}}-Ph-O\}_{\overline{a}}X+Ph-\overset{O}{\overset{\|}{C}}-Ph-\overset{O}{\overset{\|}{C}}-Ph-O-Ph-O\}_{\overline{b}}$$

9. A polymer as defined in claims 1 or 4 of the following formula:

$$+Ph-\overset{O}{\overset{\|}{C}}-Ph-\overset{O}{\overset{\|}{C}}-Ph-O\}_{\overline{a}}X+Ph-\overset{O}{\overset{\|}{C}}-Ph-O\}_{\overline{b}}$$

10. A polymer as defined in claims 1 or 4 of the following formula:

$$+Ph-\overset{O}{\overset{\|}{C}}-Ph-\overset{O}{\overset{\|}{C}}-Ph-O-Ph-O\}_{\overline{a}}X+Ph-\overset{O}{\overset{\|}{C}}-Ph-O\}_{\overline{b}}$$

11. A polymer as defined in claims 1 or 4 of the following formula:

$$+Ph-\overset{O}{\overset{\|}{C}}-Ph-O-Ph-O\}_{\overline{a}}X+Ph-\overset{O}{\overset{\|}{C}}-Ph-O-Ph-O-Ph-O\}_{\overline{b}}$$

12. A polymer as defined in claims 1 or 4 of the following formula:

$$+Ph-\overset{O}{\overset{\|}{C}}-Ph-\overset{O}{\overset{\|}{C}}-Ph-O\}_{\overline{a}}X+Ph-\overset{O}{\overset{\|}{C}}-Ph-O-Ph-O-Ph-O\}_{\overline{b}}$$

13. A polymer as defined in claims 1 or 4 of the following formula:

$$+Ph-\overset{O}{\overset{\|}{C}}-Ph-\overset{O}{\overset{\|}{C}}-Ph-O-Ph-O\}_{\overline{a}}X+Ph-\overset{O}{\overset{\|}{C}}-Ph-O\}_{\overline{b}}$$

14. A polymer as defined in claims 1 or 4 of the following formula:

$$+Ph-\overset{O}{\overset{\|}{C}}-Ph-O-Ph-O-Ph-O\}_{\overline{a}}X+Ph-\overset{O}{\overset{\|}{C}}-Ph-O\}_{\overline{b}}$$

15. A polymer as defined in claims 1 or 4 of the following formula:

$$+O-Ph-Ph-\overset{O}{\overset{\|}{C}}-Ph-\overset{O}{\overset{\|}{C}}-Ph\}_{\overline{a}}X+O-Ph-\overset{O}{\overset{\|}{C}}-Ph-\overset{O}{\overset{\|}{C}}-Ph-O-Ph\}_{\overline{b}}$$

16. A polymer as defined in claims 1 or 4 of the following formula:

$$+O-Ph-O-Ph-\overset{O}{\overset{\|}{C}}-Ph-O-Ph\}_{\overline{a}}X+O-Ph-\overset{O}{\overset{\|}{C}}-Ph-O-Ph-\overset{O}{\overset{\|}{C}}-Ph\}_{\overline{b}}$$

17. A polymer as defined in claims 1 or 4 of the following formula:

$$+Ph-\overset{O}{\overset{\|}{C}}+Ph-O-Ph-\overset{O}{\overset{\|}{C}}\}_{\overline{n}}Ph-O-Ph-\overset{O}{\overset{\|}{C}}-Ph-O-Ph-Ph-O\}_{\overline{y}}$$

n is an integer of from 1 to about 100, and y has a value of at least 1 up to about 50.

18. A polymer as defined in claims 1 or 4 of the following formula:

$$+Ph-\overset{O}{\overset{\|}{C}}-Ph-O-Ph+\overset{O}{\overset{\|}{C}}-Ph-\overset{O}{\overset{\|}{C}}-Ph-O-Ph\}_{\overline{n}}\overset{O}{\overset{\|}{C}}-Ph-O-Ph-O\}_{\overline{y}}$$

n in an integer of from 1 to about 100, and y has a value of at least 1 up to about 50.

19. The crystalline poly(aryl ether ketone) of claim 1 which contains repeating units of one or more of the following formulae:

$$+O-Ph-\overset{O}{\overset{\|}{C}}-Ph+X-Ar\}_{\overline{m}}] \quad (I)$$

$$\left\{+(Ph-O\}_{\overline{a}}Ph+\overset{O}{\overset{\|}{C}}-Ph\}_{\overline{b}}O\}_{\overline{c}}Ph-\overset{O}{\overset{\|}{C}}-Ph+O-Ph\}_{\overline{d}}\overset{O}{\overset{\|}{C}}-\right\} \quad (II)$$

$$-Ph-X-Ph-O-Ph-\overset{O}{\overset{\|}{C}}-Ph-O- \quad (III)$$

$$-Ph-O-Ph-X+Ar-X\}_{\overline{z}}Ph-O- \quad (IV)$$

$$-Ph-X-Ph-O-Ph-X+Ar-X\}_{\overline{z}}Ph-O- \quad (V)$$

wherein Ar is independently a divalent aromatic radical selected from phenylene or biphenylene, X is independently O, $$\overset{O}{\overset{\|}{C}}.$$

or a direct bond; n is an integer of from 0 to 3, b, c, d and e are 0 to 1; a is an integer of 1 to 4.

20. A polymer as defined in claim 1 of the following formula:

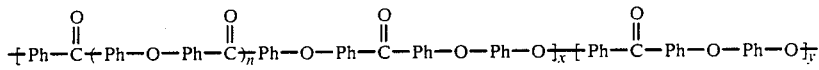

n is an integer of from 1 to about 100, x is a number of from 1 to about 1,000 and y has a value of at least 1 up to about 50.

21. A polymer as defined in claim 1 or 4 of the following formula:

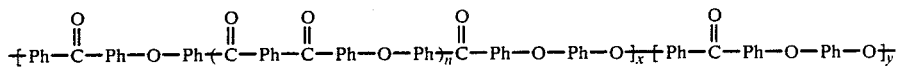

n is an integer of from 1 to about 100, x is a number of from 1 to about 1,000 and y has a value of at least 1 up to about 50.

22. A polymer as defined in claim 1 or 4 of the following formula:

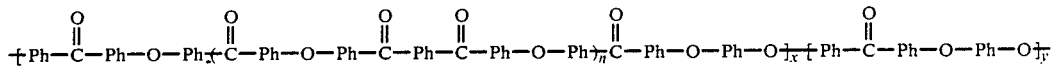

n is an integer of from 1 to about 100, x is a number of from 1 to about 1,000 and y has a value of at least 1 up to about 50.

* * * * *

UNITED STATES PATENT OFFICE
CERTIFICATE OF CORRECTION

Patent No. 4,774,296    Dated September 27, 1988

Inventor(s) Clendinning, Harris, Kelsey, Matzner, Robeson, Winslow, Maresca

It is certified that error appears in the above-identified patent and that said Letters Patent are hereby corrected as shown below:

PATENT

| Column | Line | |
|---|---|---|
| 1 | 47 | "Imperical" should read --Imperial-- |
| 14 | 44 | "-Ph-$\overset{O}{\underset{\|\|}{C}}$-Ph)$\rho$-" should read -- -Ph-$\overset{O}{\underset{\|\|}{C}}$-Ph$\rightarrow$)$\rho$- -- |
| 32 | 26 | "(073)" should read --(.073)-- |
| 36 | 13 | "200" should read --220-- |
| 37 | 1 | "-(A)aXd(B)b]c" should read --$[(A)_a X_d-(B)_b]_c$-- |
| 37 | 37 | "-PH-" should read -- -Ph- -- |
| 38 | 17 | "$[(O-Ph-\overset{O}{\underset{\|\|}{C}}-Ph)_x-O..$" should read --$[(O-Ph-\overset{O}{\underset{\|\|}{C}}-Ph-\overset{O}{\underset{\|\|}{C}}-Ph)_x-O..$-- |

Signed and Sealed this

Eleventh Day of April, 1989

Attest:

DONALD J. QUIGG

Attesting Officer    Commissioner of Patents and Trademarks